United States Patent [19]

Rothem et al.

[11] Patent Number: 5,136,804
[45] Date of Patent: Aug. 11, 1992

[54] SYSTEM FOR GERMINATION, PROPAGATION AND GROWING PLANTS IN ULTRASONIC-FOG CONDITIONS (AEROPONICS)

[75] Inventors: Tuvia Rothem, Ramat-Gan; Amiram Keshet, Rehovot, both of Israel

[73] Assignee: Shira Aeroponics (1984) Ltd., Rehovot, Israel

[21] Appl. No.: 327,616

[22] Filed: Mar. 23, 1989

[30] Foreign Application Priority Data

Oct. 20, 1988 [IL] Israel ..................................... 088105

[51] Int. Cl.⁵ .................................................. A01G 25/00
[52] U.S. Cl. ............................................... 47/60; 47/59
[58] Field of Search ................. 47/59, 60, 62, 63, 64,
47/79, 80, 82, 83, 14–16, 1.3; 239/102.1, 102.2

[56] References Cited

U.S. PATENT DOCUMENTS

| | | | |
|---|---|---|---|
| 3,991,514 | 11/1976 | Finck | 47/61 |
| 4,410,139 | 10/1983 | Nishikawa et al. | 239/102.2 |
| 4,869,019 | 9/1989 | Ehrlich | 47/59 |
| 4,911,866 | 3/1990 | Monroe | 239/102.2 |

Primary Examiner—David A. Scherbel
Assistant Examiner—Michele A. Van Patten
Attorney, Agent, or Firm—Benjamin J. Barish

[57] ABSTRACT

An apparatus for aeroponically growing plants, having a housing including a partition defining an upper compartment and a lower compartment, the partition including means of supporting a plurality of plants. The apparatus comprises a fog generator including a container for receiving a quantity of water, and a ultrasonic transducer located within the container to be immersed in the water when received therein, and thereby to generate a fog in the upper end of the container. Also having conduit means to direct the generated fog to the compartments of the housing.

13 Claims, 1 Drawing Sheet

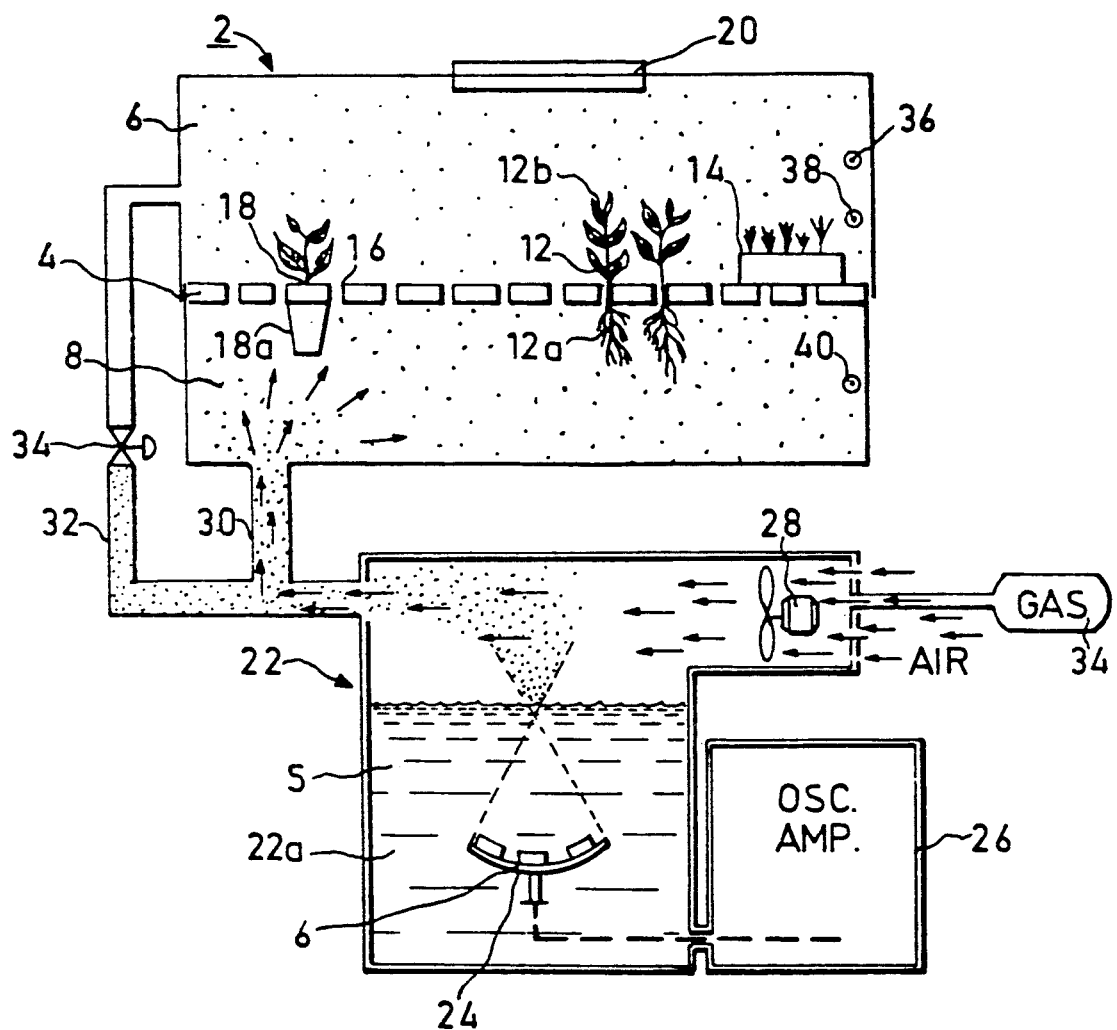

SYSTEM FOR GERMINATION, PROPAGATION AND GROWING PLANTS IN ULTRASONIC-FOG CONDITIONS (AEROPONICS)

FIELD OF THE INVENTION

The present invention relates to horticulture and more particularly to the growth and development of plants, especially the root portions and/or shoot portions thereof, in a generally gaseous environment into which a water and/or nutrient-containing fog is introduced.

BACKGROUND OF THE INVENTION

Aeroponics, or the growth of plants in air has been known for some time. F. W. Went describes experimental apparatus for growing plant roots in a vaporized nutrient in a publication entitled "The Experimental Control of Plant Growth" (1957) Cronica Botanica Co. Waltham, Mass. at pages 81-83. Even earlier, in a publication entitled "A Method of Growing Plants in Water Vapor to Faccilitate Examination of roots", Phytopathology Volume 32 pages 623-625, 1942, W. A. Carter described apparatus for growing plants with their roots in water vapor. In an article entitled "Method for Growing Plants Aeroponically", in Plant Physiology (1976) Vol. 57, pages 344-346, Zobel et al describe an experimental growing box employing a rotating spinner for mist generation. The above publications, extending over more than 35 years, all relate to experimental devices designed to permit examination and relatively free access to plant roots for treatment, all within a research context. The advantages of soil-less and detached media for propagation and cultivation of many horticultural crops are self-evident. All these systems, including many types of hydroponic units, rely on the use of a solid medium to support the roots. Aeroponics is a unique method of propagating and growing plants with their root systems enclosed within a fog chamber. The advantages of this system were discussed previously (Acta Horticulturae, 1981).

Two patents relating to the above mentioned system (an Israeli patent No. 50126 and a U.S. Pat. No. 4,332,105), describe in details the technique which has been developed for commercial applications in growing plants aeroponically.

Recently, we invented a new fog-aeroponic method which alleviates the need for high water pressure and filtration devices. Physiologically, it provides for maximal aeration, combined with adequate, continous, water, and nutrient supply to the plant. Taken together, these advantages allow uninterrupted growth of both roots and shoots.

SUMMARY OF THE INVENTION

The Present invention seeks to overcome problems and difficulties associated with former aeroponics systems by incorporating new atomizing apparatus based on ultrasonics. The atomizing apparatus can be external to the structure or within it, and the fog or mist is conveyed into the system by suitable tubes.

According to the present invention, there is provided apparatus for aeroponically growing plants, comprising a housing including a partition defining an upper compartment and a lower compartment, the partition including means of supporting a plurality of plants with the roots exposed in the lower compartment and the shoots exposed in the upper compartment. The apparatus further comprises a fog generator including a container for receiving a quantity of water, and an ultrasonic transducer located within the container to be immersed in the water when received therein, and thereby to generate a fog in the upper end of the container. Conduit means directs the generated fog from the upper end of the container to at least the lower compartment of the housing.

According to further features in the described embodiment, the conduit means includes a conduit for directing a part of the generated fog to the lower compartment, and another conduit for directing another part of the generated fog to the upper compartment. More particularly, at least one of the conduits includes a control valve 33 for controlling the relative amount of the generated fog directed to the lower and upper compartments, respectively.

According to further features in the described preferred embodiment, the fog generator further includes a fan for circulating the fog produced at the upper end of the container via the conduit means to the upper and lower compartments. The fog generator may further include a supply of a gas directed by the blower to the upper end of the container for mixing with the fog generator therein.

Further, in accordance with an embodiment of the invention, the water and/or nutrient solution applied to the roots are not recycled automatically, and can be sterilized before being reused. The excess water or solution is drained away from the system, and can be discarded or reused at the will of the system user. Thus, the possible transmission of diseases from one plant to others is avoided.

The fog produced by the ultrasonic method consists of droplets of such small size that the fog is very stable and diffuses through holes from the root compartment of the system into the shoot compartment thereof, thus applying water and nutrients to all parts of the plants. In accordance with the capacity of the ultrasonic atomizer, the same atomizer can feed fog into more than one unit. Furthermore, the air stream carrying the fog into the system can contain other gases such as $CO_2$ which are beneficial to plant growth.

The invention will be more fully understood and appreciated from the following detailed description taken in conjunction with the single drawing figure.

DETAILED DESCRIPTION OF THE INVENTION

Referring to single drawing figure, there is shown in a schematic illustration the aeroponic growth and propagation system, constructed and operative in accordance with an embodiment of the invention.

The apparatus illustrated in the drawing comprises a housing, generally designated 2, including a partition 4 defining an upper compartment 6 and a lower compartment 8. Partition 4 is formed with a plurality of small openings 10 for supporting a plurality of plants 12 with the roots 12a exposed in the lower compartment 8, and the shoots 12b exposed in the upper compartment 6. Partition 4 also serves as a shelf and its flat upper surface may be used for supporting a tray 14 carrying a plurality of seeds to be first germinated by the apparatus, and then to be individually transferred to and supported in one of the openings 10. Partition 4 may be further formed with larger openings, as shown at 16, for supporting larger plants in pots 18a.

Housing 2 further includes an opening 20 at the upper end of the upper chamber 6 venting that chamber to the atmosphere. Opening 20 is adjustable in size so as to vary the size of the vent.

The illustrated apparatus further includes a fog generator, generally designated 22, a part of which serves as a container 22a for a quantity of water. An ultrasonic transducer 24 is located withing container 22a at a level so as to be immersed in the water when water is received in the container. Transducer 24 is driven by an oscillator-amplifier drive circuit 26 and is oriented to focus the ultrasonic waves at the water level to thereby nebulize the water.

Container 22a is to be only partially filled with water so that, when the ultrasonic transducer 24 is operated, a fog is generated at the upper end of the container. Fog generator 22 further includes a fan 28 located laterally of the upper end of the container for circulating the fog produced therein to compartment 8 via conduit 30, and to compartment 6 via conduit 32. Conduit 32 includes a control valve 34 for controlling the amount of generated fog directed to compartment 6, thereby fixing the relative amount of the generated fog supplied to the two compartments.

The illustrated apparatus further includes a gas container 34 for supplying a gas, such as carbon dioxide, to the fan to be mixed thereby with the fog generated at the upper end of container 22a.

The drive unit 26 supplies energy at the appropriate frequency (typically between 30,000 and 2,000,000 CPS) to the piezoelectric transducers 24 at power levels between a few watts and kilowatts. Increasing the frequency, brings about a decrease in droplet size, thus generating a more stable fog. The illustrated apparatus further includes sensors, 36, 38, 40, which measure the various parameters of the system such as temperature, humidity, gas composition and light intensity. These sensors can be placed at will either in the upper or lower compartment or both. The walls of the lower compartment 8, exposing the roots 12a, are preferrably made of opaque material, whereas the walls of the upper compartment 6 are preferably made of transparent material. It will be appreciated that the fog generator 22 may be operated by the drive unit 26 periodically as preset by the user, or automatically in response to signal derived from the sensors 36, 38, 40.

We claim:

1. Apparatus for aeroponically growing plants, comprising:

a housing including a partition defining an upper compartment and a lower compartment; said partition including means supporting a plurality of plants with the roots exposed in the lower compartment and the shoots exposed in the upper compartment;

a fog generator including a container for receiving a quantity of water, and an ultrasonic transducer located within the container to be immersed in the water when received therein, and thereby to generate a fog in the upper end of the container;

a conduit for directing a part of the generated fog to said lower compartment;

and another conduit for directing another part of the generated fog to said upper compartment.

2. The apparatus according to claim 1, wherein at least one of said conduits includes a control valve for controlling the relative amount of the generated fog to said lower and upper compartments, respectively.

3. The apparatus according to claim 1, wherein said housing is formed with opaque walls in said lower compartment.

4. The apparatus according to claim 1, wherein said housing is formed with transparent walls in said upper compartment.

5. The apparatus according to claim 1, wherein said fog generator further includes a fan for circulating the fog produced at the upper end of the container via said conduit means to said upper and lower compartments.

6. The apparatus according to claim 5, wherein said fog generator further includes a supply of a gas directed by said fan to the upper end of said container for mixing with the fog generated therein.

7. The apparatus according to claim 1, wherein said housing further includes an opening at the upper end of its upper compartment venting its interior to the atmosphere.

8. The apparatus according to claim 7, wherein said opening is adjustable in size.

9. The apparatus according to claim 1, wherein said partition includes a shelf formed with a plurality of openings each for receiving one of said plants.

10. The apparatus according to claim 1, wherein said partition include a flat upper surface for also supporting thereon a tray containing a plurality of seeds to be first germinated by the apparatus and then to be individually transferred to and supported in said openings in the partitions.

11. The apparatus according to claim 1, wherein said housing further includes a temperature sensor.

12. The apparatus according to claim 1, wherein said housing further includes a humidity sensor.

13. The apparatus according to claim 1, wherein said housing further includes a gas composition sensor.

* * * * *